(12) United States Patent
Yu

(10) Patent No.: US 9,894,097 B2
(45) Date of Patent: Feb. 13, 2018

(54) METHOD AND DEVICE FOR IDENTIFYING ABNORMAL APPLICATION

(71) Applicant: TENCENT TECHNOLOGY (SHENZHEN) COMPANY LIMITED, Shenzhen (CN)

(72) Inventor: Wenfeng Yu, Shenzhen (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 137 days.

(21) Appl. No.: 14/700,323

(22) Filed: Apr. 30, 2015

(65) Prior Publication Data
US 2015/0244731 A1  Aug. 27, 2015

Related U.S. Application Data

(63) Continuation of application No. PCT/CN2013/085930, filed on Oct. 25, 2013.

(30) Foreign Application Priority Data

Nov. 5, 2012 (CN) .......................... 2012 1 0436204

(51) Int. Cl.
G06F 12/14 (2006.01)
H04L 29/06 (2006.01)
(Continued)

(52) U.S. Cl.
CPC .......... *H04L 63/145* (2013.01); *G06F 21/566* (2013.01); *H04L 43/04* (2013.01); *H04L 63/1408* (2013.01); *H04L 63/1416* (2013.01)

(58) Field of Classification Search
None
See application file for complete search history.

(56) References Cited

U.S. PATENT DOCUMENTS 8,850,579 B1 * 9/2014 Kalinichenko ......... G06F 21/53
 726/22
2003/0105973 A1 * 6/2003 Liang ..................... G06F 21/56
 726/24

(Continued)

FOREIGN PATENT DOCUMENTS

CN  1818823 A  8/2006
CN  102034042 A  4/2011

(Continued)

OTHER PUBLICATIONS

International Search Report for Application No. PCT/CN2013/085930, dated Jan. 23, 2014.

(Continued)

*Primary Examiner* — Lisa Lewis
*Assistant Examiner* — Olanrewaju Bucknor
(74) *Attorney, Agent, or Firm* — Harness, Dickey & Pierce, P.L.C.

(57) ABSTRACT

A method and device for identifying an abnormal application are provided. The method includes executing abnormal applications, obtaining dynamic behavior information of the abnormal applications, inputting the dynamic behavior information of the abnormal applications into a preset detection network, obtaining a behavior rule of the dynamic behavior information via the detection network, and identifying a detected application according to the behavior rule to determine whether the detected application is an abnormal application.

13 Claims, 2 Drawing Sheets

(51) Int. Cl.
    *G06F 21/56*     (2013.01)
    *H04L 12/26*     (2006.01)

(56) References Cited

U.S. PATENT DOCUMENTS

| | | | |
|---|---|---|---|
| 2003/0149888 A1* | 8/2003 | Yadav | H04L 63/1408 726/23 |
| 2006/0242705 A1* | 10/2006 | Sadhasivam | H04L 63/145 726/23 |
| 2007/0300300 A1* | 12/2007 | Guo | G06F 21/552 726/23 |
| 2008/0196103 A1* | 8/2008 | Lin | H04L 63/1416 726/24 |
| 2009/0300765 A1* | 12/2009 | Moskovitch | G06F 21/562 726/24 |
| 2010/0017487 A1* | 1/2010 | Patinkin | G06Q 10/107 709/206 |
| 2010/0122317 A1* | 5/2010 | Yadav | H04L 63/1408 726/1 |
| 2011/0167495 A1* | 7/2011 | Antonakakis | G06F 21/577 726/24 |
| 2011/0283361 A1* | 11/2011 | Perdisci | G06F 21/56 726/24 |
| 2012/0198549 A1* | 8/2012 | Antonakakis | H04L 61/1511 726/22 |
| 2012/0304007 A1* | 11/2012 | Hanks | H04L 67/12 714/26 |
| 2012/0304244 A1* | 11/2012 | Xie | G06F 21/00 726/1 |
| 2013/0198841 A1* | 8/2013 | Poulson | G06F 21/566 726/23 |
| 2013/0291109 A1* | 10/2013 | Staniford | H04L 63/1416 726/23 |
| 2013/0291111 A1* | 10/2013 | Zhou | G06F 21/566 726/23 |
| 2013/0326626 A1* | 12/2013 | Martynenko | G06F 21/55 726/24 |
| 2014/0223556 A1* | 8/2014 | Bignon | H04L 63/1441 726/22 |

FOREIGN PATENT DOCUMENTS

| | | |
|---|---|---|
| CN | 102508768 A | 6/2012 |
| CN | 102567661 A | 7/2012 |
| CN | 102647409 A | 8/2012 |

OTHER PUBLICATIONS

Chinese Office Action for Application No. 2012104362040 dated Mar. 3, 2016, and an English concise explanation of relevance thereof.

International Preliminary Report for Application No. PCT/CN2013/085930 dated May 14, 2015.

* cited by examiner

METHOD AND DEVICE FOR IDENTIFYING ABNORMAL APPLICATION

CROSS-REFERENCE TO RELATED APPLICATIONS

This application is a continuation of International Application No. PCT/CN2013/085930, filed Oct. 25, 2013. This application claims the benefit and priority of Chinese Application No. 201210436204.0, filed Nov. 5, 2012. The entire disclosures of each of the above applications are incorporated herein by reference.

FIELD

The present disclosure relates to a method and device for identifying an abnormal application.

BACKGROUND

This section provides background information related to the present disclosure which is not necessarily prior art.

With the growing popularity of the Internet, the demand is high for network security performance. After a user logs on to the Internet using a computer, the computer may be infected by a virus or Trojan for a variety of reasons. In the prior art, there are two methods for identifying the virus or Trojan.

The first method is a feature scanning method. With this method, if the user finds an unknown virus, the virus is analyzed, a virus feature is extracted according to characteristics of the virus, and the extracted virus feature is added to a virus feature database. In the foregoing virus scanning process, if a suspicious file is found, the suspicious file is compared with virus features in the virus feature database to determine whether the suspicious file is infected by a virus. One disadvantage is that this method cannot identify an unknown virus. With the rise in different types of viruses, especially in the development of polymorphic viruses and hidden viruses, the virus feature database is becoming larger. In view of the foregoing, this method cannot satisfy the requirement for rapidly scanning and killing an unknown virus.

The second method is a human rule behavior heuristic scanning method. With this method, a virus sample is manually analyzed, behavior rules of the virus sample are summarized, and the summarized behavior rules are saved in a database. When the suspicious file is found, runtime behavior of the suspicious file is compared with behavior rules which are stored in advance one by one. If a behavior rule matching the runtime behavior of the suspicious file is found, the suspicious file is determined as the virus. This method may identify some unknown viruses. With the continued development of new viruses, unknown viruses continuously appear and the virus behavior changes. The method of manually analyzing and summarizing the virus behavior is inefficient and does not satisfy the requirement of efficiently scanning and killing the viruses.

In summary, one technical issue to be solved is enhancing the efficiency of scanning and killing new viruses.

SUMMARY

This section provides a general summary of the disclosure, and is not a comprehensive disclosure of its full scope or all of its features.

The present disclosure provides a method for identifying an abnormal program to identify new viruses and enhance the efficiency of scanning and killing the viruses.

In order to achieve the above technical solution, the present disclosure provides a method for identifying an abnormal application, including:
    executing abnormal applications;
    obtaining dynamic behavior information of the abnormal applications;
    inputting the dynamic behavior information of the abnormal applications into a preset detection network;
    obtaining a behavior rule of the dynamic behavior information via the detection network; and
    identifying a detected application according to the behavior rule to determine whether the detected application is an abnormal application.

In various embodiments, before executing the abnormal applications, the method further includes presetting the detection network.

In various embodiments, the method for inputting the dynamic behavior information of the abnormal applications into the preset detection network includes:
    converting the dynamic behavior information of the abnormal applications into a behavior vector; and
    inputting the behavior vector into the detection network.

In various embodiments, before executing the abnormal applications, the method further includes:
    establishing a dynamic behavior information monitoring point; and
    obtaining the dynamic behavior information of the abnormal applications via the dynamic behavior information monitoring point.

In various embodiments, the detection network is a back propagation network. The present disclosure provides a device for identifying an abnormal program to identify new viruses and enhance the efficiency of scanning and killing the viruses.

The present disclosure provides a device for identifying an abnormal application. The device includes:
    a dynamic behavior information obtaining module, to execute abnormal applications and obtain dynamic behavior information of the abnormal applications;
    a dynamic behavior information transmission module, to input the dynamic behavior information of the abnormal applications into a preset detection network;
    a behavior rule obtaining module, to obtain a behavior rule of the dynamic behavior information via the detection network; and
    an identification module, to identify a detected application according to the behavior rule to determine whether the detected application is an abnormal application.

In various embodiments, the device further includes a detection network generation module, to preset the detection network. In various embodiments, the device further include: a behavior vector conversion module, to convert the dynamic behavior information of the abnormal applications into a behavior vector. The dynamic behavior information transmission module is further to input the behavior vector into the detection network. In various embodiments, the device further includes a monitoring point establishment module, to establish a dynamic behavior information monitoring point. The dynamic behavior information obtaining module is further to obtain the dynamic behavior information of the abnormal applications via the dynamic behavior information monitoring point. In various embodiments, the detection network is a back propagation network.

The present disclosure further provides non-transitory computer-readable medium storing instructions which, when executed by one or more processors, cause a device to perform a method for identifying an abnormal application. The method includes:

executing abnormal applications;

obtaining dynamic behavior information of the abnormal applications;

inputting the dynamic behavior information of the abnormal applications into a preset detection network;

obtaining a behavior rule of the dynamic behavior information via the detection network; and identifying a detected application according to the behavior rule to determine whether the detected application is an abnormal application.

In the present disclosure, a detection network is established in advance, stored abnormal applications are executed, the dynamic behavior information of the abnormal applications is obtained, the obtained dynamic behavior information is input into the detection network, the behavior rule for obtaining the abnormal applications is summarized by the detection network, and other abnormal applications are identified according to the behavior rule. The present disclosure may identify the new viruses and enhance the efficiency of scanning and killing the viruses.

Further areas of applicability will become apparent from the description provided herein. The description and various embodiments in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Various embodiments will now be described more fully with reference to the accompanying drawings.

For simplicity and illustrative purposes, the present disclosure is described by referring to various embodiments. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used throughout the present disclosure, the term "includes" means includes but not limited to, the term "including" means including but not limited to. The term "based on" means based at least in part on. In addition, the terms "a" and "an" are intended to denote at least one of a particular element.

Figure 1A:
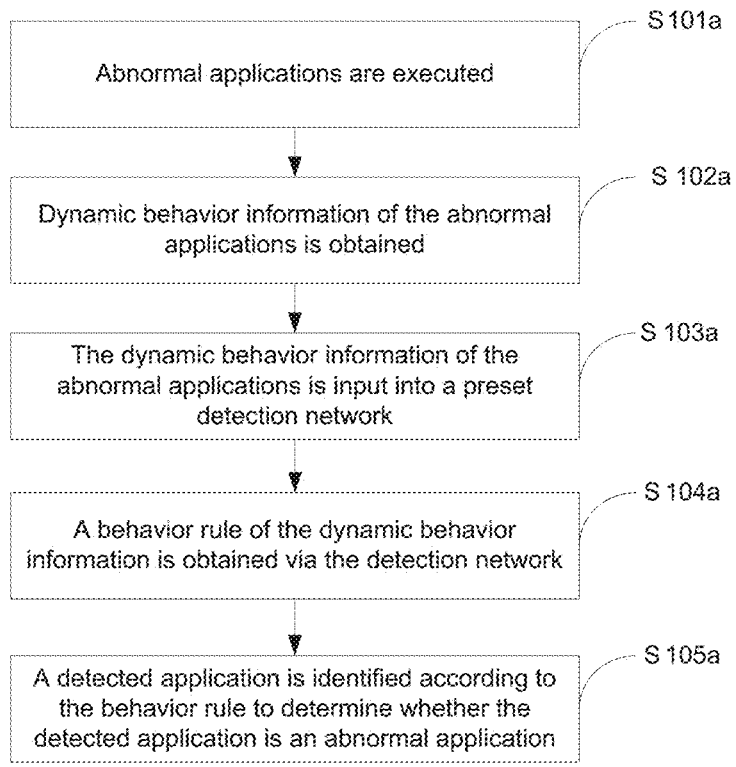
FIG. 1a is a flow chart illustrating a method for identifying an abnormal application in accordance with various embodiments.

FIG. 1a is a flow chart illustrating a method for identifying an abnormal application in accordance with various embodiments. The method includes the following blocks.

Block 101a: Abnormal applications are executed. The abnormal applications are dangerous applications, such as the viruses and Trojans affecting the normal operation of the computer.

Block 102a: Dynamic behavior information of the abnormal applications is obtained.

Block 103a: The dynamic behavior information of the abnormal applications is input into a preset detection network.

Block 104a: A behavior rule of the dynamic behavior information is obtained via the detection network.

Block 105a: A detected application is identified according to the behavior rule to determine whether the detected application is an abnormal application.

Figure 1B:
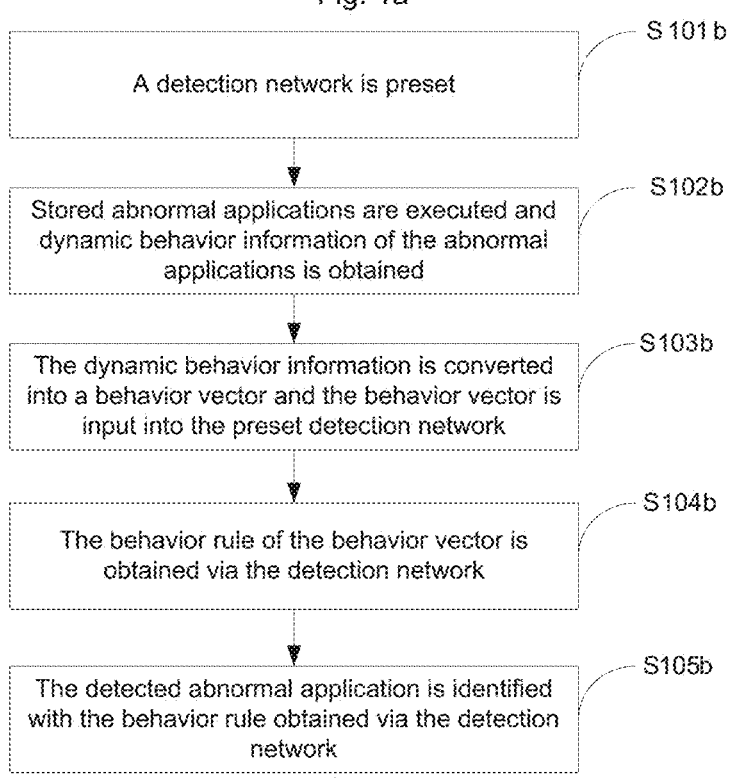
FIG. 1b is a flow chart illustrating another method for identifying an abnormal application in accordance with various embodiments.

FIG. 1b is a flow chart illustrating another method for identifying an abnormal application in accordance with various embodiments.

Block S101b: A detection network is preset. The detection network provided by the present disclosure may be a Back Propagation (BP) neural network. The BP neural network is a multi-layer feed-forward network trained according to an error back propagation algorithm. The BP neural network acquires and stores a large number of input/output mode mapping relationships and needs not to disclose mathematical equations describing the above mapping relationships in advance.

Block S102b: Stored abnormal applications are executed and dynamic behavior information of the abnormal applications is obtained. In various embodiments, the abnormal applications may be a virus or a Trojan program and may be an improper program affecting the usage of the computer or the terminal device. The abnormal applications are not listed here. The stored abnormal applications may be executed on a virtual machine and the dynamic behavior information of the abnormal applications is obtained via a pre-established behavior monitoring point. For example, a danger registry operation monitoring point, a sensitive file operation monitoring point, a network connection monitoring point or Application Programming Interface (API) call monitoring point, etc. may be established on the virtual machine, which is described in detail hereinafter.

Block S103b: The obtained dynamic behavior information is converted into a behavior vector and the behavior vector is input into the preset detection network. A behavior vector mapping rule is established in the present disclosure in advance and the obtained dynamic behavior information is mapped into the behavior vector. Whether an operation is performed on a danger registry is determined. If an operation is performed on the danger registry, the result is 1; otherwise, the result is 0. Whether an operation is performed on a sensitive file is determined. If an operation is performed on the sensitive file, the result is 1; otherwise, the result is 0. Whether a dangerous operation is performed on network connection is determined. If a dangerous operation is performed on the network connection, the result is 1; otherwise, the result is 0. Whether an operation is performed on API (1) is determined. If an operation is performed on API (1), the result is 1; otherwise, the result is 0. Whether an operation is performed on API (2) is determined. If an operation is performed on API (2), the result is 1; otherwise, the result is 0. A result output vector {0, 1, 0, 1, 1} representing the dynamic behavior information is generated. The input of the detection network is the behavior vector and the output of the detection network is the result output vector. The result output vector denotes whether the scanned application is in danger, 1 represents that the scanned application is not in danger and 0 represents that the scanned application is in danger.

Various embodiments are given hereinafter taking the detection network as the BP neural network for example. The process for converting the obtained dynamic behavior information into the behavior vector is as follows. Assuming that an expression of the BP neural network is $y=f(x)$, x represents the input behavior vector and y represents the result output vector. The result that y is equal to 1 represents normal (the result that y is equal to 1 or y is close to 1 is determined as normal). The result that y is equal to 0 represents abnormal (the result that y is equal to 0 or y is close to 0 is determined as abnormal). There is a behavior vector, in which x is equal to $\{1, 1, 0, 1, 0, 1, 0, 1 \ldots\}$ and the behavior vector belongs to abnormal (yd is equal to 0 and yd represents a desired result value). The value x is input into the BP neural network and the output is yc (yc represents an actual output value). A difference square operation ($(yd-yc)^2$) is performed on yd and yc. Whether the result is less than a threshold value a is determined. If the result is less than a, a weight of each node in the BP neural network needs to be fed back and adjusted. If the result is larger than a, the weight of each node in the BP neural network needs to be fed back and adjusted, until $(yd-yc)^2<a$.

An appropriate range of weight adjustment learning rate of the BP neural network is 0.3 to 5.0. An appropriate range of momentum learning rate is 1.0 to 1.5. An appropriate range of error limit is less than or equal to 0.0001. The error calculated using an average value of the difference square is $(yd-yc)^2/m$, $(yd-yc)^2/m<0.0001$, yd represents the desired output value, yc represents the actual output value, m represents the number of output layer neurons, and m is equal to 1.

Block S104b: The behavior rule of the behavior vector is obtained via the detection network.

Block S105b: The detected abnormal application is identified with the behavior rule obtained via the detection network.

The present disclosure adopts two kinds of application samples. One sample includes completely abnormal applications and the other sample includes completely normal applications. The completely abnormal applications include different types of abnormal applications. The different types of abnormal applications are executed one by one. The dynamic behavior information of the abnormal applications is obtained via an established monitoring point, the obtained dynamic behavior information is converted into the corresponding behavior vector, and the converted behavior vector is input into the pre-set detection network to perform the feedback training.

The completely normal applications are then selected and are executed one by one. The dynamic behavior information of the normal applications is obtained via the established monitoring point, the obtained dynamic behavior information is converted into the corresponding behavior vector, and the converted behavior vector is input into the preset detection network to perform the feedback training. In the present disclosure, the completely normal applications are executed and other applications are detected according to the execution result, by which misidentification may be avoided.

Behavior monitoring points are classified into four types.

The first type is danger registry operation monitoring point. That is, a danger registry is established in a database file in advance and registries in which danger may likely exist are defined as the danger registries. The detected application is then executed by a virtual machine, an operation registry of the detected application is obtained, the operation registry is matched with the danger registries in the database file, and whether there is a danger registry matching with the operation registry of the detected application is determined. If there is a danger registry matching with the operation registry, the result output vector is 1; otherwise, the result output vector is 0.

The second type is a sensitive file operation monitoring point. That is, a sensitive file table is established in the database file in advance and filenames of sensitive files in which danger may exist and paths of the sensitive files are stored in the sensitive file table. The detected application is executed via the virtual machine, an operation file entry of the detected application is obtained, the operation file entry is matched with the sensitive file table in the database file, and whether there is a filename or path of the sensitive file matching with the operation file entry of the detected application is determined. If there is a filename or path of the sensitive file matching with the operation file entry, the result output vector is 1; otherwise, the result output vector is 0.

The third type is a network connection monitoring point. That is, a danger Uniform Resource Location (URL) and IP table is established in the database file. (URL)s and (IP)s, in which danger may exist are stored in the danger URL and IP table. The detected application is then executed by the virtual machine, the network connection information of the detected application is obtained, and whether there is network connection information in the URL and IP table is determined. If there is network connection information in the URL and IP table, the result output vector is 1; otherwise, the result output vector is 0.

The fourth type is a system API call monitoring point. That is, a system API call table is stored in the database file in advance. The detected application is then executed by the virtual machine and the situation of called system (API)s of the detected application is obtained. As shown in the following table, an entry corresponding to a called system API is configured as 1 and an entry corresponding to the system API which is not called is configured as 0.

| | |
|---|---|
| API 1 (FindWindow) | 1 |
| API 2 (CreateProcess) | 0 |
| API 3 (WriteProcessMemory) | 1 |
| ... | ... |

The detection network provided, such as the BP neural network, includes an input layer, an intermediate layer, and an output layer. The number of neurons of the input layer is 1003. Each of the danger registry operation monitoring points, including the sensitive file operation monitoring point and the network connection monitoring point, occupy 3 neurons. The system API call monitoring point occupies 1000 input neurons. The intermediate layer includes a first intermediate layer and a second intermediate layer. The number of neurons of the first intermediate layer is 60000 and the number of the neurons of the second intermediate layer is 60000. When the output value of the output layer is closing to 1 or equals to 1, the detected application is normal. When the output value of the output layer is closing to 0 or equals to 0, the detected application is abnormal.

Figure 2:
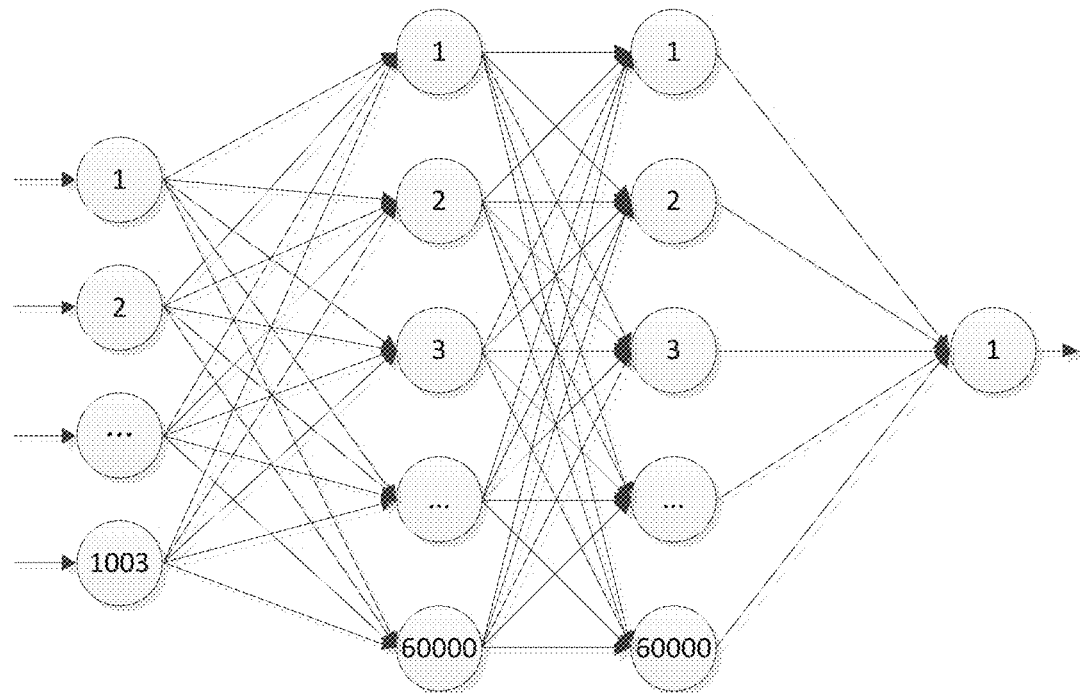
FIG. 2 is a diagram illustrating a model of a detection network in accordance with various embodiments.

FIG. 2 is a diagram illustrating a model of a detection network in accordance with various embodiments. In the detection network, formulas (1) and (2) are taken as activation functions (called activation functions) of the model of the detection network.

The activation function:

$$y=1/(1+\exp(-x)) \quad (1)$$

A function obtained by taking a derivative of the activation function:

$$y=1.0/(\exp(x)*\text{pow}((1.0/\exp(x)+1),2.0)) \quad (2)$$

Referring to the following table

| Engine | Scanning number | Detection number | Detection rate |
|---|---|---|---|
| Feature scanning method | 5000 | 1247 | 24.9% |
| Human rule behavior heuristic scanning method | 5000 | 1375 | 27.5% |
| BP neural network engine | 5000 | 1487 | 29.7% |

According to various embodiments, 5000 mixed samples are randomly extracted from an application sample database and comparison test scanning is performed on the 5000 mixed samples. The detection rate on the basis of the detection network (BP neural network) is higher than any of the detection rates on the basis of the feature scanning method and the human rule behavior heuristic scanning method in the conventional method.

Figure 3:
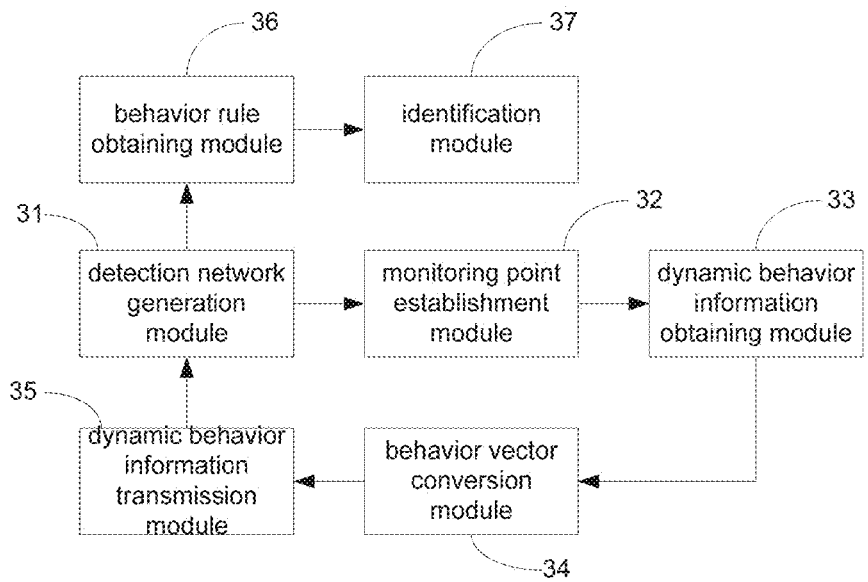
FIG. 3 is a diagram illustrating a device for identifying an abnormal application in accordance with various embodiments.

FIG. 3 is a diagram illustrating another device for identifying an abnormal application in accordance with various embodiments. The device for identifying an abnormal application includes a detection network generation module 31, a monitoring point establishment module 32, a dynamic behavior information obtaining module 33, a behavior vector conversion module 34, a dynamic behavior information transmission module 35, a behavior rule obtaining module 36, and an identification module 37.

The detection network generation module 31 generates a detection network in advance. The detection network is a back propagation network. The monitoring point establishment module 32 is to establish a dynamic behavior information monitoring point. According to various embodiments, a danger registry operation monitoring point, a sensitive file operation monitoring point, a network connection monitoring point or an API call monitoring point, etc. may be established on the virtual machine.

The dynamic behavior information obtaining module 33 executes stored abnormal applications and obtain the dynamic behavior information of the abnormal applications via the dynamic behavior information monitoring point. The behavior vector conversion module 34 converts the dynamic behavior information of the abnormal applications into a behavior vector. The dynamic behavior information transmission module 35 inputs the behavior vector into the detection network, i.e. input the obtained dynamic behavior information of the obtained abnormal applications into the preset detection network.

The behavior rule obtaining module 35 obtains the behavior rule of the dynamic behavior information via the detection network. The identification module 36 identifies a detected application according to the obtained behavior rule to determine whether the detected application is an abnormal application.

The working process of the device for identifying the abnormal application may be obtained by referring to the detailed description of the method for identifying the abnormal application, which is not repeated herein.

In the present disclosure, a detection network is established in advance, stored abnormal applications are executed, the dynamic behavior information of the abnormal applications is obtained, the obtained dynamic behavior information is input into the detection network, the detection network summarizes the behavior rule for obtaining the abnormal applications, and other abnormal applications are identified according to the behavior rule. The present disclosure may identify the new viruses and enhance the efficiency of scanning and killing the viruses.

The foregoing describes various embodiments of the present disclosure. The protection scope of the present disclosure, however, is not limited to the above description. Any change or substitution, easily occurring to those skilled in the art, should be covered by the protection scope of the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

What is claimed is:

1. A method for identifying an abnormal application, comprising:

executing, by a virtual machine, prestored abnormal applications, which are viruses or Trojan programs;

obtaining dynamic behavior information of the prestored abnormal applications;

inputting the dynamic behavior information of the prestored abnormal applications into a preset detection network;

obtaining a behavior rule of the dynamic behavior information via the preset detection network; and identifying a detected application according to the behavior rule of the dynamic behavior information to determine whether the detected application is a virus or Trojan program;

wherein inputting the dynamic behavior information of the prestored abnormal applications into the preset detection network includes converting the dynamic behavior vector; and inputting the behavior vector into the preset detection network; and wherein obtaining dynamic behavior information of the prestored abnormal applications and converting the dynamic behavior information of the prestored abnormal applications into a behavior vector includes:

monitoring whether each of the abnormal applications executes at least one of operating a danger registry, operating a sensitive file, performing dangerous operation on network connection, and operating and Application Programming Interface (API);

when one of the above operations is executed, one of number 0 and 1 is allocated, when one of the above operations is nor performed, the other one of number 0 and 1 is allocated; and creating a behavior vector comprising the allocated 0 and 1.

2. The method for identifying an abnormal application according to claim 1, wherein before executing the prestored abnormal applications, the method further comprises:

presetting the preset detection network.

3. The method for identifying an abnormal application according to claim 1, wherein before executing the prestored abnormal applications, the method further comprises:

establishing a dynamic behavior information monitoring point; and obtaining the dynamic behavior information of the prestored abnormal applications via the dynamic behavior information monitoring point.

4. The method for identifying an abnormal application according to claim 1, wherein the preset detection network is a back propagation network.

5. A device for identifying an abnormal application, comprising:

a dynamic behavior information obtaining module configured to execute prestored abnormal applications, which are viruses or Trojan programs, and obtain dynamic behavior information of the prestored abnormal applications;

a dynamic behavior information transmission module configured to input the dynamic behavior information of the prestored abnormal applications into a preset detection network;

a behavior rule obtaining module^ configured to obtain a behavior rule of the dynamic behavior information via the preset detection network; and an identification module configured to identify a detected application according to the behavior rule of the dynamic behavior information to determine whether the detected application is a virus or Trojan program;

wherein the dynamic behavior information obtaining module is configured to monitor whether each of the abnormal applications executes at least one of operating a danger registry, operating a sensitive file, performing dangerous operation on network connection, and operating an Application Programming Interface (API); and wherein the device further includes a behavior vector conversion module configured to allocate one of number 0 and 1 when one of the above operations is executed, and allocate the other one of number 0 and 1 when the above operations is not performed, and create a behavior vector comprising the allocated number 0 and 1.

6. The device for identifying an abnormal application according to claim 5, further comprising:

a detection network generation module, to preset the detection network.

7. The device for identifying an abnormal application according to claim 5, wherein the dynamic behavior information transmission module is further to input the behavior vector into the preset detection network.

8. The device for identifying an abnormal application according to claim 5, further comprising:

a monitoring point establishment module, to establish a dynamic behavior information monitoring point; wherein the dynamic behavior information obtaining module is further to obtain the dynamic behavior information of the prestored abnormal applications via the dynamic behavior information monitoring point.

9. The device for identifying an abnormal application according to claim 5, wherein the preset detection network is a back propagation network.

10. A non-transitory computer-readable medium storing instructions which, when executed by one or more processors, cause a device to perform a method for identifying an abnormal application, the method comprising:

executing prestored abnormal applications, which are viruses or Trojan programs;

obtaining dynamic behavior information of the prestored abnormal applications; inputting the dynamic behavior information of the prestored abnormal applications into a preset detection network;

obtaining a behavior rule of the dynamic behavior information via the preset detection network; and identifying a detected application according to the behavior rule of the dynamic behavior information to determine whether the detected application is a virus or Trojan program;

wherein inputting the dynamic behavior information of the prestored abnormal applications into the preset detection network includes converting the dynamic behavior vector; and inputting the behavior vector into the preset detection network; and wherein obtaining dynamic behavior information of the prestored abnormal applications and converting the dynamic behavior information of the prestored abnormal applications into a behavior vector includes:

monitoring whether each of the abnormal applications executes at least one of operating a danger registry, operating a sensitive file, performing dangerous operation on network connection, and operating and Application Programming Interface (API);

when one of the above operations is executed, one of number 0 and 1 is allocated, when one of the above operations is nor performed, the other one of number 0 and 1 is allocated; and creating a behavior vector comprising the allocated 0 and 1.

11. The non-transitory computer-readable medium according to claim 10, wherein the non-transitory computer-readable medium further stores instructions which, when executed by one or more processors, cause a device to preset the detection network before executing the prestored abnormal applications.

12. The non-transitory computer-readable medium according to claim 10, wherein the non-transitory computer-readable medium further stores instructions which, when executed by one or more processors, cause a device to establish a dynamic behavior information monitoring point before executing the prestored abnormal applications; and obtain the dynamic behavior information of the prestored abnormal applications via the dynamic behavior information monitoring point.

13. The non-transitory computer-readable medium according to claim 10, wherein the preset detection network is a back propagation network.

* * * * *